United States Patent
Hao et al.

(10) Patent No.: US 8,595,151 B2
(45) Date of Patent: Nov. 26, 2013

(54) SELECTING SENTIMENT ATTRIBUTES FOR VISUALIZATION

(75) Inventors: Ming C. Hao, Palo Alto, CA (US); Umeshwar Dayal, Saratoga, CA (US); Christian Rohrdantz, Constance (DE); Meichun Hsu, Los Altos Hills, CA (US); Mohamed E. Dekhil, Santa Clara, CA (US); Riddhiman Ghosh, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 189 days.

(21) Appl. No.: 13/155,570

(22) Filed: Jun. 8, 2011

(65) Prior Publication Data

US 2012/0317049 A1    Dec. 13, 2012

(51) Int. Cl.
*G06Q 10/00*    (2012.01)
*G06Q 30/00*    (2012.01)

(52) U.S. Cl.
USPC ................... 705/347; 705/1.1; 705/7.29

(58) Field of Classification Search
USPC ................ 705/1.1, 319, 347, 7.29
See application file for complete search history.

(56) References Cited

U.S. PATENT DOCUMENTS

| | | |
|---|---|---|
| 2008/0250326 A1 | 10/2008 | Mather |
| 2009/0048823 A1 | 2/2009 | Liu |
| 2009/0193328 A1 | 7/2009 | Reis |
| 2009/0265307 A1 | 10/2009 | Reisman |
| 2010/0023311 A1 | 1/2010 | Subrahmanian |
| 2010/0121707 A1* | 5/2010 | Goeldi .............. 705/14.49 |
| 2010/0306192 A1 | 12/2010 | Kapur |

FOREIGN PATENT DOCUMENTS

| | | |
|---|---|---|
| JP | 2007018285 | 1/2007 |
| WO | 2009087636 | 7/2009 |

OTHER PUBLICATIONS

Gawalt et al., ACM, Discovering Word Associations in News Media via Feature Selection and Sparse Classification, Mar. 2010 (pp. 211-220).*

Wanner et al., Large-scale Comparative Sentiment Analysis of News Articles, 2009 (2 pages).*

Hao, "Visual Opinion Analysis of Customer Feedback Data," IEEE Symposium on Visual Analytics Science and Technology. Oct. 12-13, 2009.   http://ieeexplore.ieee.org/xpls/abs_all.jsp?arnumber=5333919&tag=1.*

Miao et al., 2008 IEEE/WIC/ACM International Conference on Web Intelligence and Intelligent Agent Technology, "A Unified Framework for Opinion Retrieval", 2008 (pp. 739-742).

Duan et al., Computer Science, Advances in Knowledge Discovery and Data Mining, SpringerLink—Abstract, CCRM: An Effective Algorithm for Mining Commodity Information from Threaded Chinese Customer Reviews, 2007 (1 page).

Shi et al., Research Article—Science Alert—An Attribute-based Sentiment Analysis System, Aug. 2010 (9 pages).

(Continued)

*Primary Examiner* — Candice D Wilson (57) ABSTRACT

Data records containing user feedback regarding at least one offering are received. From among candidate attributes in the received data records, a subset of attributes that relate to user sentiment regarding the at least one offering is selected, where the selecting is according to selection criteria including frequency of occurrence of the candidate attributes, relative amounts of negative and positive feedback associated with the candidate attributes, and time density of feedback associated with the candidate attributes. A visualization of at least one sentiment characteristic of the selected subset of attributes that relate to user sentiment is presented for display.

24 Claims, 7 Drawing Sheets
(5 of 7 Drawing Sheet(s) Filed in Color)

(56) References Cited

OTHER PUBLICATIONS

Zhang et al., IEEE Computer Society 2009, Improving Movie Gross Prediction Through News Analysis, 2009 (pp. 301-304).

Balahur et al., IEEE Computer Society 2009, Opinion Mining on Newspaper Quotations, 2009 (4 pages).

Abbasi et al., ACM Transactions on Information Systems, vol. 26, No. 3, Article 12, Sentiment Analysis in Multiple Languages: Feature Selection for Opinion Classification in Web Forums, Jun. 2008 (34 pages).

Zhang et al., ACM Digital Library—Abstract, Sentiment Analysis of Chinese Documents: From Sentence to Document Level, Dec. 2009 (1 page).

Crimson Hexagon Products (www.crimsonhexagon.com), Major Enhancement to Crimson Hexagon Platform Delivers Groundbreaking New Social Media Monitoring and Analysis Capabilities, Oct. 2010 (2 pages).

SYSOMOS (www.sysomos.com) Best Global Brands Online, Oct. 2009 (4 pages).

Goorha et al., ACM Digital Library—Abstract, Discovery of Significant Emerging Trends, Jul. 2010 (1 page).

Hao et al., Chinese Receiving Office, International Appl. No. PCT/CN2011/000957entitled "Sentiment Trend Visualization Relating to an Event Occurring in a Particular Geographic Region" filed Jun. 8, 2011 (31 pages).

Castellanos et al., U.S. Receiving Office, International Appl. No. PCT/US11/39566 entitled "Determining and Visualizing Social Media Expressed Sentiment" filed Jun. 8, 2011 (25 pages).

Yingcai Wu, OpinionSeer: Interactive Visualization of Hotel Customer Feedback, IEEE, Oct. 2010 (10 pages).

Hao et al., U.S. Appl. No. 13/209,739 entitled "Visualizing Sentiment Results with Visual Indicators Representing User Sentiment and Level of Uncertainty", filed Aug. 15, 2011 (34 pages).

* cited by examiner

SELECTING SENTIMENT ATTRIBUTES FOR VISUALIZATION

BACKGROUND

Customers often provide feedback, in the form of reviews, regarding offerings (products or services) of different enterprises. Reviews can be submitted online at third party sites, or alternatively, reviews can be received directly by an enterprise. There can be potentially a very large number of received reviews, which can make meaningful analysis of such reviews difficult and time-consuming.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures:

FIGS. 3-6C illustrate visualization screens for visualizing selected attributes, according to various implementations.

DETAILED DESCRIPTION

An enterprise (e.g. a company, educational organization, government agency, etc.) may collect feedback from customers (or more generally "users") to better understand user sentiment regarding an offering of the enterprise. An offering can include a product or a service provided by the enterprise. A "sentiment" refers to an attitude, opinion, or judgment of a human with respect to the offering.

If there are a relatively large number of users, then there can be relatively large amounts of user feedback. An enterprise can provide an online website to collect feedback from users. Alternatively or additionally, the enterprise can also collect feedback through telephone calls or on paper survey forms. Furthermore, feedback can be collected at third party sites, such as travel review websites, product review websites, and so forth. Some third party websites provide professional reviews of offerings from enterprises, as well as provide mechanisms for users to submit their individual reviews.

The feedback data collected by an enterprise can include a relatively large number of attributes for which users can express sentiments. For example, attributes relating to a hotel include room, carpet, food, noise, luggage, housekeeping, and so forth. Users who have stayed at the hotel may offer opinions on any, some, or all of the foregoing attributes. There can potentially be hundreds if not thousands of attributes that can be found in feedback data. A challenge faced by an enterprise in attempting to understand user sentiments regarding an offering (or offerings) of the enterprise is in selecting an appropriate subset of the candidate attributes, where the selected subset of attributes includes the attributes that are most likely to be useful for sentiment analysis.

In accordance with some implementations, visualization analytic techniques or mechanisms are provided to allow for a systematic way of selecting subsets of candidate attributes in feedback data for understanding user sentiments with respect to at least one offering of an enterprise. Selecting a "subset" of attributes found in feedback data refers to selecting a portion less than all of the attributes that are present in the feedback data with respect to which users may offer feedback.

In some implementations, visualization analytics (including selection of a subset of attributes, sentiment analysis with respect to the selected attributes, and visualization of results of the sentiment analysis regarding the selected subset of attributes) can be performed in real-time. Performing visualization analytics in "real-time" refers to performing such visualization analytics as feedback data is continually received. Although reference is made to real-time visualization analytics, note that in alternative implementations, the visualization analytics can be performed off-line, where feedback data can be collected into a log or database and studied at a later time.

Figure 1:
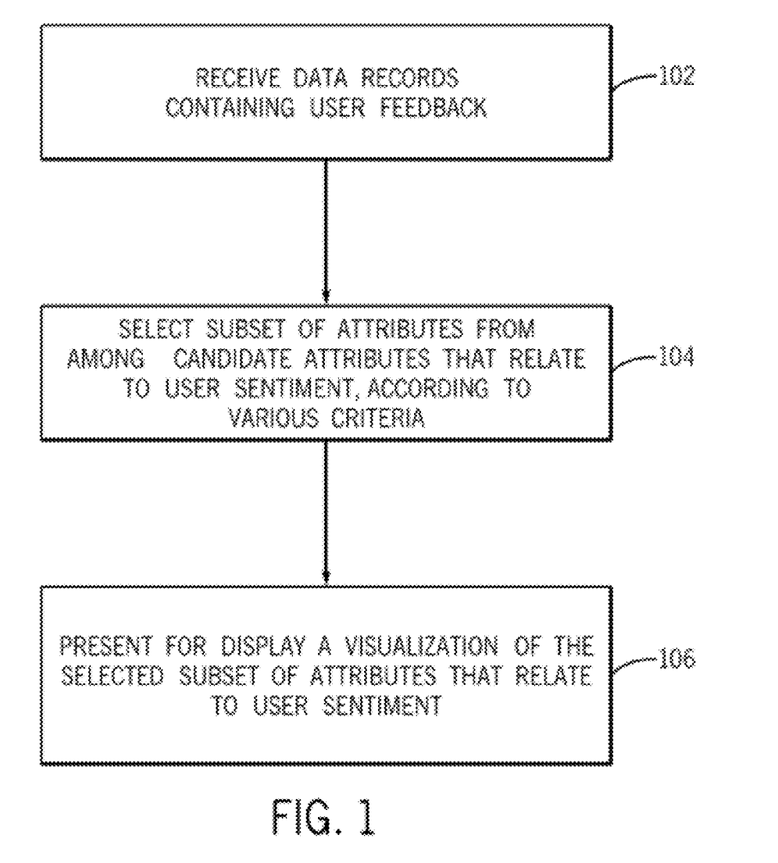
FIG. 1 is a flow diagram of a process of visualization analytics to produce visualization of attributes, according to some implementations.

FIG. 1 is a flow diagram of a process of visualization analytics according to some implementations. Data records containing user feedback regarding at least one offering are received (at 102). The data records can correspond to individual reviews submitted by users. Different reviews by users can include reviews regarding different attributes regarding the offering. In the hotel example, some reviewers may offer reviews regarding rooms and housekeeping (positive or negative or neutral), while other reviewers may offer reviews regarding hotel location and restaurants. The candidate attributes for the hotel example include at least room, housekeeping, location, and restaurant. There often are many more attributes with respect to an offering for which users can submit reviews. With a large number of data records (large number of reviews) and a large number of candidate attributes appearing in the data records, more meaningful and efficient sentiment analysis can be accomplished if the attributes actually analyzed are reduced.

From among candidate attributes in the received data records, the process selects (at 104) a subset of the attributes that relate to user sentiment regarding the at least one offering. An attribute relates to user sentiment regarding the at least one offering if users have provided feedback regarding the attribute—the feedback can be used to ascertain user sentiment regarding the attribute. The selecting at 104 can be according to various selection criteria, including frequencies of occurrence of the candidate attributes, relative amounts of negative and positive feedback associated with the candidate attributes, and time density of feedback associated with the candidate attributes.

The selection of a subset of attributes based on various criteria allows the selection of attributes based on characteristics found in the received feedback data. In this manner, visualization analytics does not rely on a static list of attributes, but the set of attributes can vary depending on the characteristics of the received feedback data.

After selecting the subset of attributes from among the candidate attributes, the process presents (at 106) for display a visualization of at least one sentiment characteristic of the selected subset of attributes that relate to user sentiment. The sentiment characteristics of each attribute can be represented in any of a number of ways. Generally, a "sentiment characteristic" refers to an indication of a sentiment expressed with respect to an attribute—the sentiment characteristic can be a sentiment score assigned to the attribute, or the sentiment characteristic can be a percentage value (or other aggregate value) indicating a collective sentiment expressed with respect to the attribute.

In some examples, the displayed visualization can include graphs to depict percentages (e.g. percentage of positive reviews and percentage of negative reviews) representing user sentiment expressed with respect to the respective attributes. Alternatively or additionally, the displayed visualization can include visual indicators associated with the attributes in the subset to depict user sentiments expressed in feedback regarding the attributes. The visual indicators can be in the form of different colors assigned to cells in the visualization to represent user sentiment expressed with respect to each attribute in the subset (e.g. a red color can indicate a negative user sentiment, a green color can indicate a positive user sentiment, and a gray color can indicate a neutral user sentiment). In other examples, different colors can be used to express different user sentiments with respect to each attribute. In yet further examples, other types of indicators can be used to represent different user sentiment, such as different shadings or hatching.

As noted above, one of the selection criteria for selecting a subset of attributes from among candidate attributes is a criterion relating to frequency of occurrence (referred to as a "high-frequency criterion"). The frequency of occurrence of a candidate attribute refers to how frequently the candidate attribute occurs in the received data records. A candidate attribute is considered to occur frequently in received data records if an amount of occurrence of the candidate attribute in the received data records exceeds some predefined threshold. For example, the amount of occurrence of the candidate attribute can be expressed as a percentage of the data records in which the candidate attribute is present—thus, the candidate attribute can be considered to be a high-frequency candidate attribute if the percentage of data records in which the candidate attribute appears is greater than some predefined percentage threshold.

As listed above, another selection criterion considered in selecting the subset of attributes is relative amounts of negative and positive feedback associated with each candidate attribute (referred to as a "large difference criterion"). A given candidate attribute can have a first number of positive feedback and a second number of negative feedback. The number of positive or negative feedback can refer to the number of data records in which the attribute appears (such as within a particular time interval being studied) and for which users have expressed positive or negative feedback, respectively. The number of positive or negative feedback can also refer to the number of times that users have expressed positive or negative review, respectively, of the given candidate attribute in the received data records.

The first number is compared to the second number, and if the first number differs from the second number by some predefined threshold, then that candidate attribute would be assigned greater importance than another candidate attribute associated with numbers of positive and negative feedback that are relatively closer together. As an example, a first candidate attribute can appear in 1,000 data records. Within the 1,000 data records, the first candidate attribute is associated with positive feedback 100 times, but is associated with negative feedback 800 times. In the remaining 100 occurrences of the given attribute, the feedback received is neutral. In the foregoing, it can be seen that the difference between the number of positive feedback (100) and the number of negative feedback (800) is relatively large.

In contrast, a second candidate attribute also appeared in 1,000 data records, but for the second candidate attribute, 300 reviews are positive, 300 reviews are negative, and 400 reviews are neutral. In this case, the difference between the positive feedback and negative feedback is small (in fact, it is zero). In the foregoing example, the first candidate attribute is assigned greater importance for understanding user sentiment than the second candidate attribute, and thus the first candidate attribute would more likely be selected to be in the subset (selected at 104 in FIG. 1).

In some implementations, a ratio can be taken between the first number of positive feedback and second number of negative feedback (for each candidate attribute), or vice versa. The ratios of respective candidate attributes can then be compared, with the candidate attributes having higher ratios assigned greater importance than candidate attributes having lower ratios. In alternative examples, instead of calculating a ratio between numbers of positive and negative feedback, differences can be taken, with such differences compared to determine which candidate attributes should be assigned greater importance than other candidate attributes.

As noted above, another selection criterion considered in selecting a subset of attributes from among candidate attributes is the time density of feedback associated with each candidate attribute (referred to as a "time density criterion"). "Time density" refers to the average time gap between successive data records that contain feedback for a given candidate attribute. For example, the average time gap between feedback for a first candidate attribute may be X, while the average time gap between feedback data records for a second candidate attribute is Y, where X<Y. In such an example, the first candidate attribute is considered more important that the second candidate attribute, since the average time gap between reviews for the first candidate attribute is smaller than the average time gap for the second candidate attribute. This is an indication that users are more interested in the first candidate attribute (and thus have expressed more feedback on the first candidate attribute). Alternatively, techniques can consider the change in time density—a sudden increase in time density of an attribute indicates that the attribute would be more important.

In addition to the three selection criteria listed above for selecting a subset of attributes from candidate attributes, other selection criteria can also be considered in further implementations. For example, an attribute associated with greater negativity is assigned greater importance than another attribute with less negativity. The "negativity" of an attribute refers to the amount of negative feedback received for the given attribute. For example, within 1,000 data records, a first candidate attribute may be associated with 500 negative reviews, whereas a second candidate attribute may be associated with 100 negative reviews. In this case, this selection criterion (referred to as the "negativity criterion") would indicate that the first candidate attribute would be more important than the second candidate attribute. Alternatively, instead of a negativity criterion, a positive criterion can be more relevant in certain application—an attribute with a greater number of positive reviews would be more important.

Another selection criterion that can be considered for selecting a subset of attributes from among candidate attributes is an application-specific criterion. An "application-specific criterion" refers to a criterion indicating that, for a given application, certain attributes are more important than other attributes. For example, if the application is sentiment analysis for hotels, then the application-specific criterion can specify a certain group of attributes that should be considered for analysis, such as room, price, and location. The application-specific criterion allows for selection of candidate attributes that are known or understood to be important factors in user sentiment regarding a particular application.

The multiple selection criteria (high-frequency criterion, large difference criterion, time density criterion, negativity criterion, and application-specific criterion) can be combined to assign an importance score to each candidate attribute. Each of the selection criteria causes an individual score to be produced for the candidate attribute. Such individual scores can be combined (such as by use of a weighted sum) to produce an overall score indicating the relative importance of the candidate attribute in user sentiment understanding. A weighted sum approach involves assigning respective weights to the individual scores (the weights are multiplied to the individual scores, and the weighted individual scores are summed to produce the overall score). The weights assigned can be equal weights, or alternatively, the weights assigned can be different.

In some implementations, the selection criteria can also be dynamically discovered based on visualization analytics techniques. Based on visualizations of sentiment characteristics of various attributes, analysts or other users can determine which selection criteria would be more useful for selecting attributes for sentiment visualization. The analyst or user can select a subset of the selection criteria listed above, for example, or alternatively, the analyst or user can modify weights assigned to the selection criteria as noted above.

Figure 2:
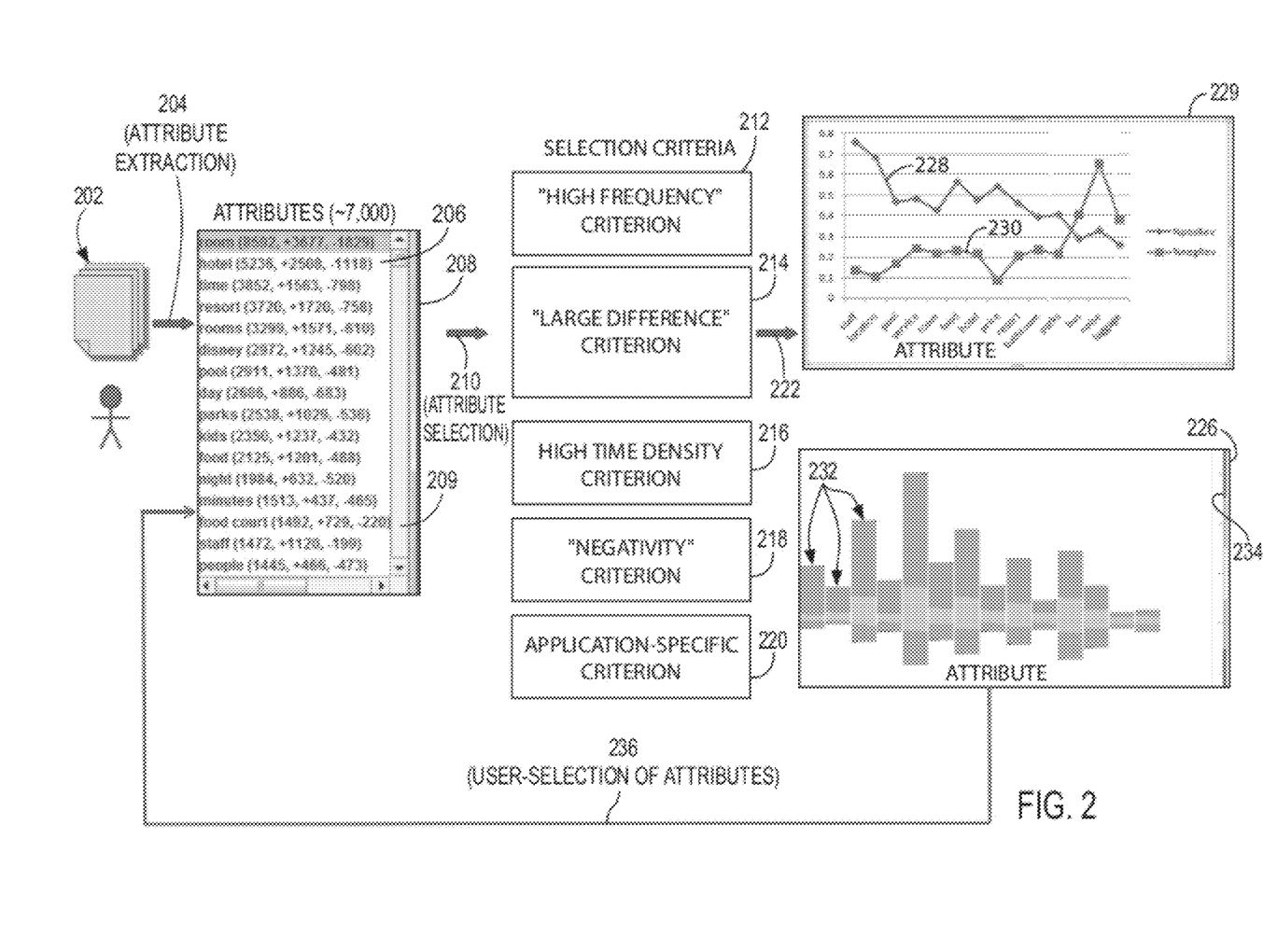
FIG. 2 is a schematic diagram of selecting attributes for visualization, according to some examples.

FIG. 2 illustrates an example visualization analytics flow. Data records (202) received from users are processed (at 204) to extract candidate attributes. In some examples, any noun or compound noun (a noun formed of multiple words, such as "customer service") in the data records 202 can be considered a candidate attribute. A list of candidate attributes (206) is extracted—in the example of FIG. 2, the list includes approximately 7,000 attributes, which is a large list. In some examples, the list of candidate attributes can be presented for display, such as in a screen 208 shown in FIG. 2. A scroll bar 209 in the screen 208 allows a viewer to scroll through the list of candidate attributes.

An attribute selection process is performed (at 210) to select a subset of candidate attributes, using selection criteria including a high-frequency criterion 212, a large difference criterion 214, a time density criterion 216, a negativity criterion 218, and an application-specific criterion 220. These five selection criteria are discussed above.

The output of the attribute selection process (210) is a subset of attributes, which can be subject to sentiment analysis (222) to produce various visualizations (e.g. 229 and 226 in FIG. 2). The visualizations 229 and 226 allow for an analyst to identify various information regarding visualized attributes, including finding patterns, correlations, and exceptions in the visualized attributes.

A pattern can be that there are a large number of negative reviews but a small number of positive reviews with respect to a particular attribute. A correlation can be that a large number of negative reviews of a first attribute coincides with a large number of negative reviews of a second attribute—thus, an analyst can determine that the root cause of negative feedback for the first attribute may be due to the second attribute. An exception can be that negative feedback for a particular attribute is an anomaly, since the feedback received for other attributes is vastly positive.

The sentiment analysis performed at 222 can be based on use of any of various different sentiment analysis techniques, which involve identifying words or phrases in the data records that relate to sentiment expressed by users with respect to each attribute. A sentiment score can be generated based on the identified words or phrases. The sentiment score provides an indication of whether the expressed sentiment is positive, negative, or neutral. The sentiment score can be a numeric score, or alternatively, the sentiment score can have one of several discrete values (e.g. Positive, Negative, Neutral).

In FIG. 2, the visualization 229 is a graph chart that has a first graph 228 that relates to positive feedback, and a second graph 230 that relates to negative feedback. Each point of the graph 228 or 230 corresponds to a respective attribute—some example attributes are shown along the horizontal axis of the graph chart in the visualization 229. The vertical axis of the graph chart, in the example given in FIG. 2, represents percentage values for indicating the percentage of received reviews that are positive or negative for each corresponding attribute. Thus, along graph 228, each point represents the percentage of positive reviews (in the received data records) for the respective attribute (e.g. for the "Staff" attribute, the percentage of positive reviews is between 70% and 80%, as depicted on graph 228). Along graph 230, each point represents the percentage of negative reviews (in the received data records) for the respective attribute.

The visualization 226 of FIG. 2 is a bar chart that includes several vertical bars 232, where each bar 232 corresponds to a respective attribute. Each bar is divided into multiple portions having respective different colors. In the example of FIG. 2, each bar 232 has a green portion, a gray portion, and a red portion. Each bar includes an arrangement of cells, where each cell corresponds to a respective individual data record 202. The color assigned to each cell indicates the type of feedback for the given attribute in the data record—if the type of feedback is positive, then the cell is assigned a green color, if the type of feedback is neutral, then the cell is assigned a gray color, and if the type of feedback is negative, then the cell is assigned a red color. A color scale 234 in the visualization 226 provides a mapping between the type of feedback and a respective color. In the example color scale 234, a more positive feedback is assigned a darker shade of green than a less positive feedback. Similarly, a more negative feedback is assigned a darker shade of red than a less negative feedback.

The color assigned to each cell can be according to the sentiment score assigned to an attribute in the sentiment analysis 222. The cells within each bar 232 are arranged in an order according to the sentiment scores, such that cells having like colors are grouped adjacent each other to form the portions of different colors contained in each bar 232.

FIG. 2 also shows a feedback path 236 from the visualizations 229, 226 to the attribute selection process 210. As examples, a user looking at visualizations 229, 226 can decide that certain attributes are not important, or that certain other attributes not shown would be interesting. Thus, the user can provide feedback (236) to de-select a visualized attribute or to select an additional attribute (not previously selected). In response to the user feedback (236), the attribute selection process 210 can be repeated to select a different subset of attributes for visualization analytics.

Figure 3:
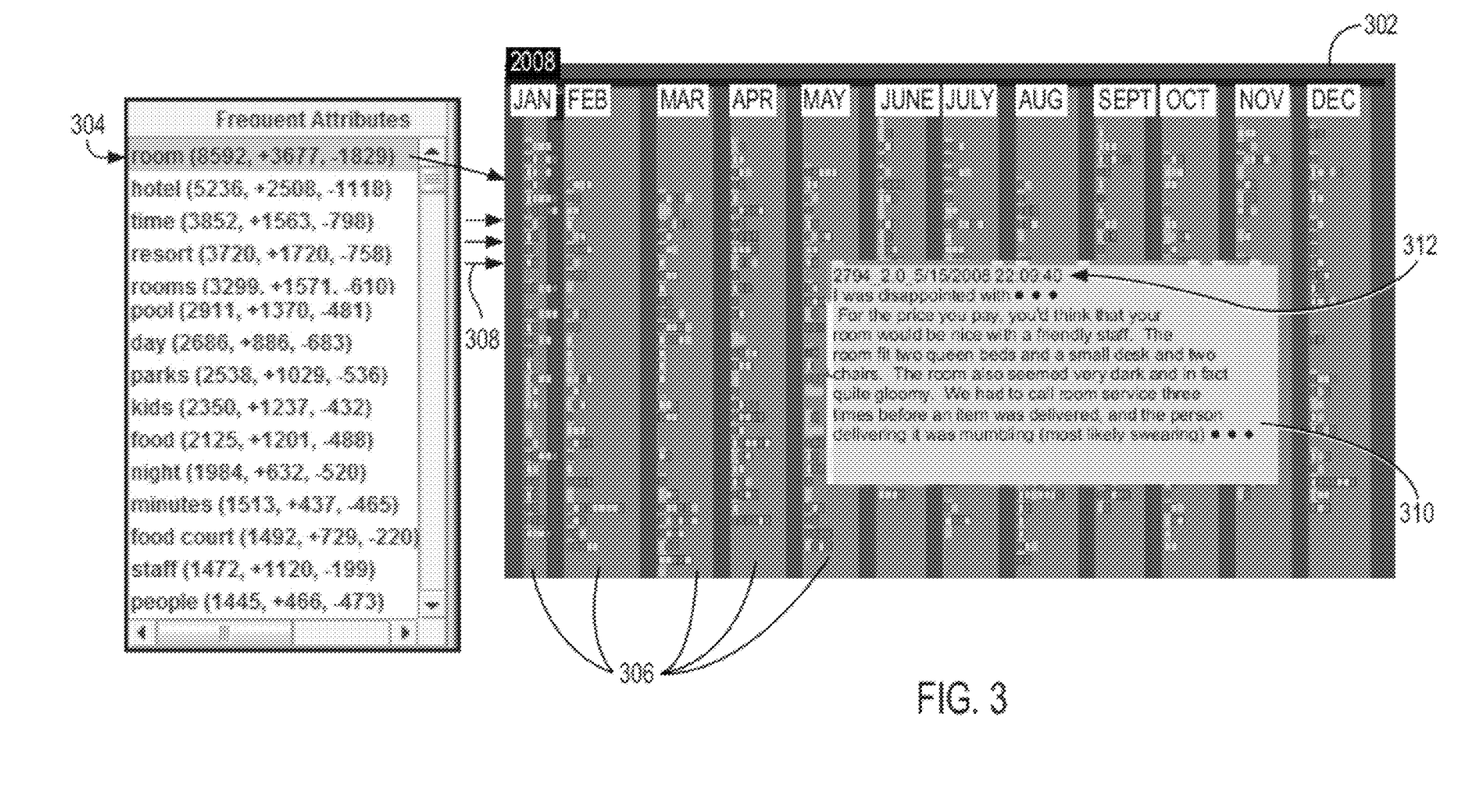

FIG. 3 shows an example calendar-view visualization 302 of cells corresponding to a respective attribute, which in this case is the "room" attribute selected at 304 in FIG. 3 (indicated by highlighting in the example of FIG. 3). A user can select the "room" attribute by clicking on or moving a cursor over the "room" attribute shown in the Frequent Attributes list in FIG. 3.

The "room" attribute is associated with various information in parentheticals, which in the example includes "(8592, +3677, −1829)". The information in parentheticals is in the following format, according to some examples: (total number of reviews, number of positive reviews, number of negative reviews). The "+" symbol and "−" symbol in the parenthetical information indicates that the number is associated with positive or negative reviews, respectively.

In the calendar-view visualization 302, the cells corresponding to different data records are arranged in columns 306 and rows 308. Each column 306 represents a respective first time interval (e.g. month). Each row represents a respective second time interval (e.g. day) having a time length different from the first time interval. Each cell (represented by a small rectangular box in FIG. 3) is assigned a corresponding color depending on the type of feedback (indicated by a respective sentiment score) received for the "room" attribute in the corresponding data record. The cell is assigned the color green if the received feedback is positive, is assigned the color red if the received feedback is negative, and is assigned the color gray if the received feedback is neutral. In the example visualization 302 of FIG. 3, it can be seen that the "room" attribute is a high-frequency attribute, since the "room" attribute appears in greater than some predefined percentage threshold of the received reviews.

FIG. 3 also shows a pop-up box 310, where the pop-up box contains specific user comments received in a particular data record. A viewer can position a cursor over a particular cell, and the pop-up box 310 would appear that contains the specific user comments of the data record associated with the particular cell. In addition to user comments, date and time information 312 can also be displayed in the pop-up box 310.

Figure 4:
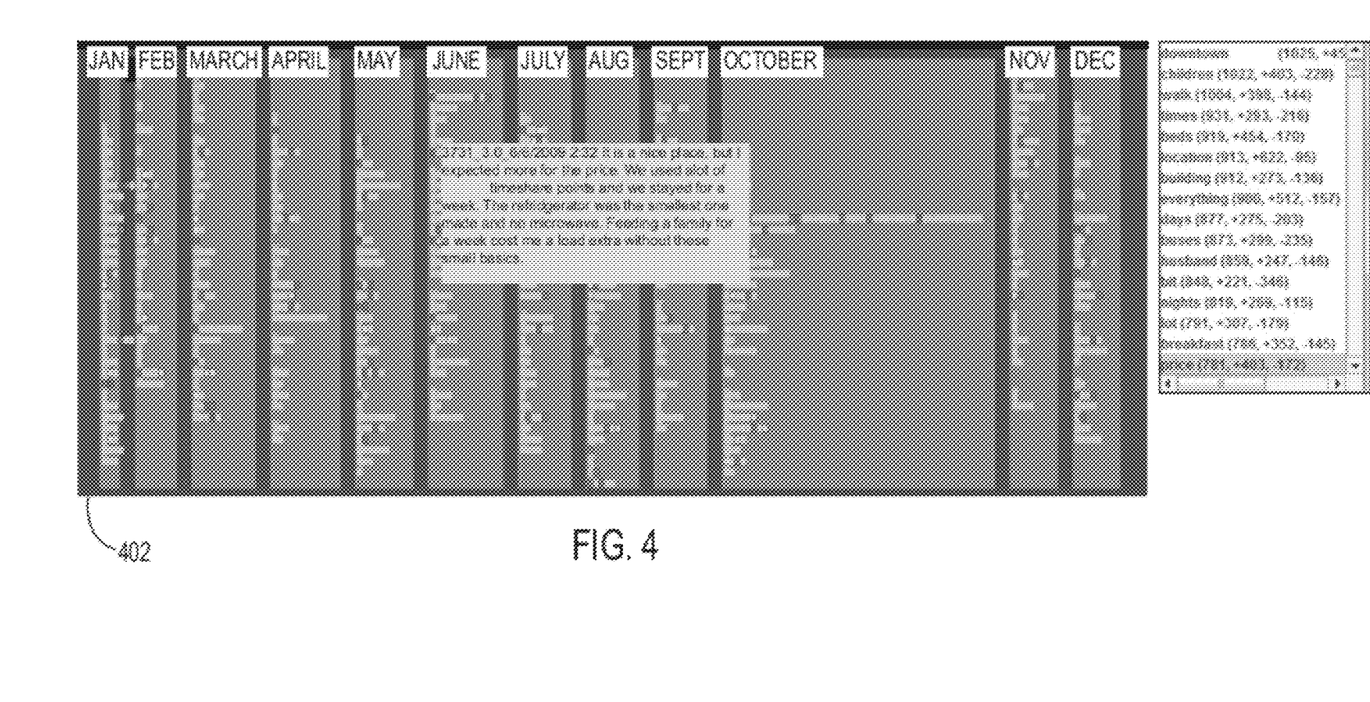

FIG. 4 illustrates another example calendar-view visualization 402. In this example, a different attribute is selected for viewing, in this case a "price" attribute. As can be seen in the visualization 402 of FIG. 4, the number of positive feedbacks (represented by the green cells) far outnumber the number of negative feedback (represented by the red cells). This is an indication that the "price" attribute is a high-difference attribute (according to the high-difference selection criterion discussed above), and thus would be a desirable attribute for visualization.

Figure 5:
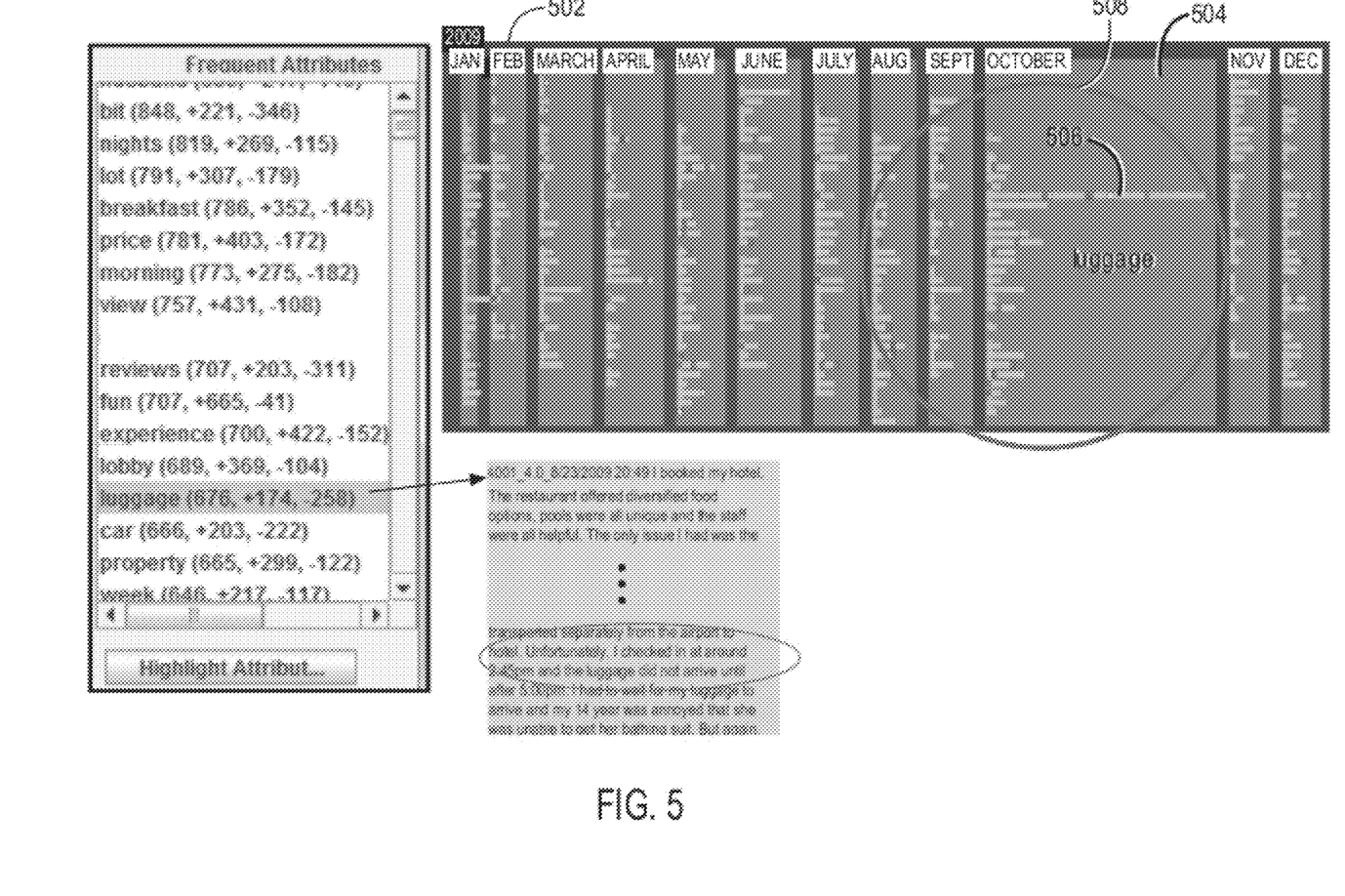

FIG. 5 shows yet another calendar-view visualization 502. In the visualization 502, the attribute that is visualized is the "luggage" attribute. In this example, it can be seen that in column 504, there is a density of cells 506 occurring on a particular day in October. The region in the circle 508 indicates that the "luggage" attribute is associated with a high time density of reviews (according to the time density selection criterion discussed above), which is an indication that the "luggage" attribute can be more important than other attributes.

Figure 6A:
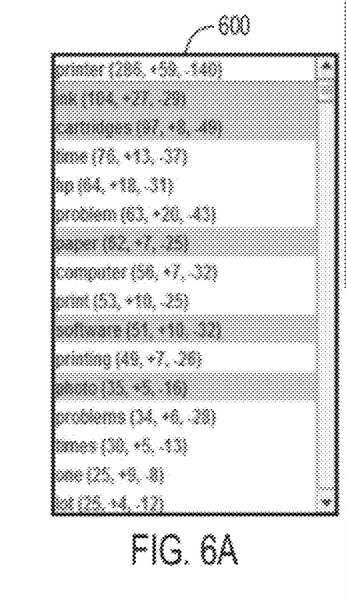
Figure 6B:
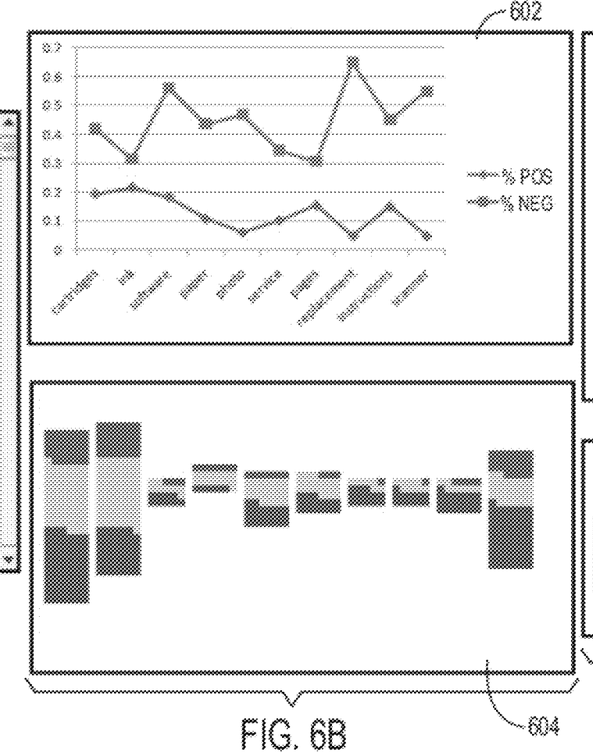
Figure 6C:
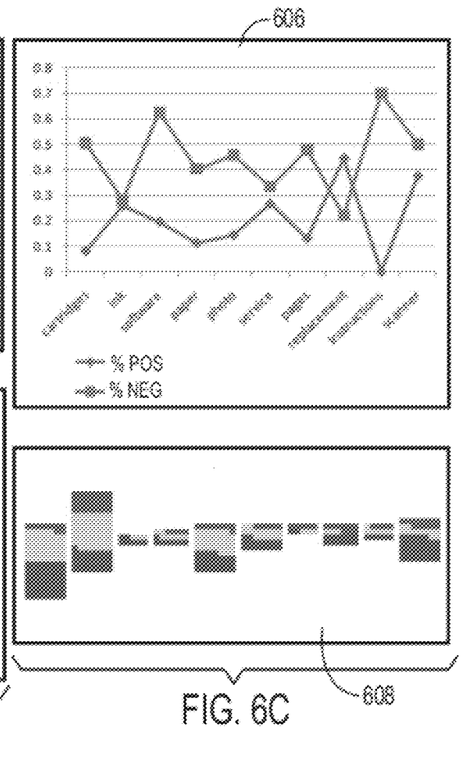

FIG. 6A-6C illustrate another example visualization. In FIG. 6A, a number of attributes are highlighted (selected) in a screen 600 listing attributes that are to be subject to visualization analytics according to some implementations. These selected attributes are visualized in visualization screens shown in FIGS. 6B and 6C. Each of FIGS. 6B and 6C depicts a respective graph chart and bar chart. FIG. 6B shows a graph chart 602 and a bar chart 604 for the selected attributes, while FIG. 6C shows a graph chart 606 and a bar chart 608 for the selected attributes.

The difference between FIGS. 6B and 6C is that the visualizations of FIG. 6B are for a one-month period, whereas the visualizations of FIG. 6C are for a six-month period. Based on comparison between the visualizations of FIGS. 6B and 6C, a user can easily compare user feedback over a one-month period versus a six-month period, and find various interesting facts. For example, after six months, the "cartridge" attribute may be associated with more negative reviews (as compared to negative reviews in the one-month period), but other attributes may be associated with fewer negative reviews (such as the "ink" and "replacement" attributes).

Figure 7:
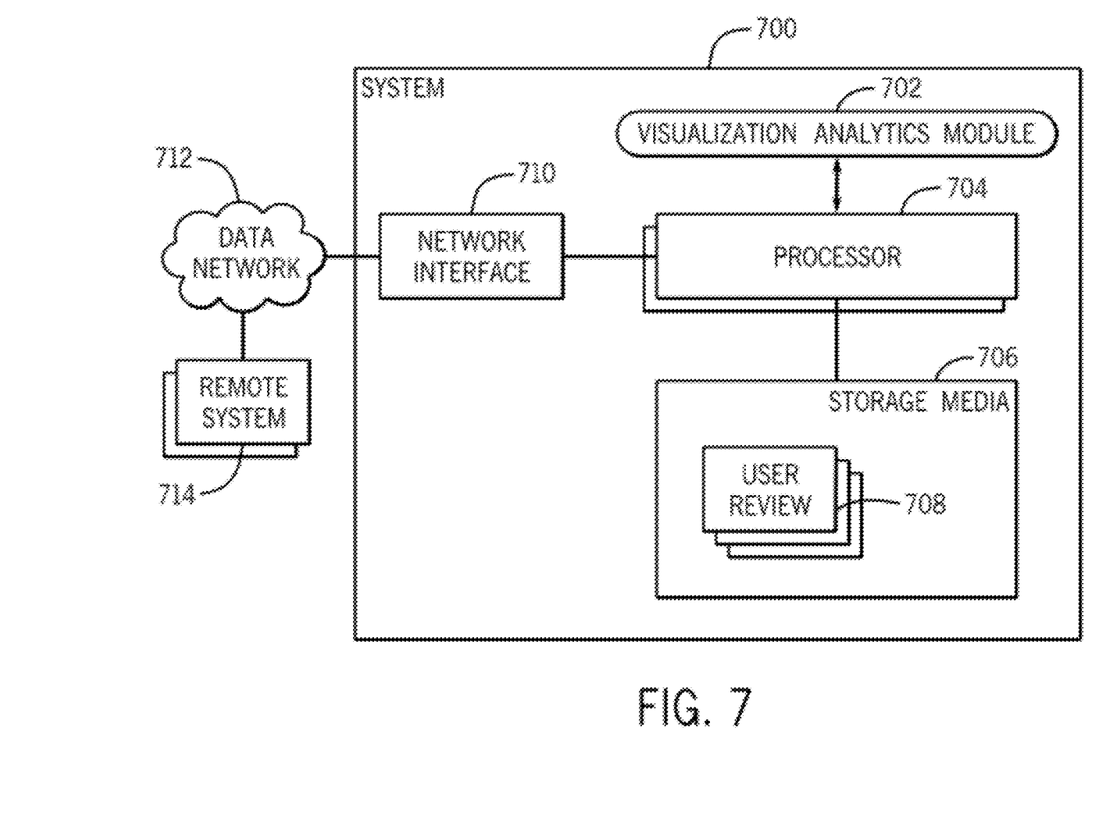
FIG. 7 is a block diagram of an example system incorporating some implementations.

FIG. 7 is a block diagram of an example system 700 that includes a visualization analytics module 702 executable on one or multiple processors 704. The visualization analytics module 702 can perform the various tasks discussed above, including any of the processes of FIGS. 1 and 2. The processor(s) 704 is (are) connected to storage media 706, which can store user reviews 708. In addition, the system 700 includes a network interface 710, which allows the system 700 to communicate over a data network 712 with remote systems 714. Further user reviews can be received from the remote system 714 at the system 700, which can be further processed by the visualization analytics module 702 according to some implementations.

A processor can include a microprocessor, microcontroller, processor module or subsystem, programmable integrated circuit, programmable gate array, or another control or computing device.

The storage media 706 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving, by a system including a processor, data records containing user feedback regarding at least one offering;
   from among candidate attributes in the received data records, selecting, by the system, a subset of attributes that relate to user sentiment regarding the at least one offering, wherein the selecting is according to selection criteria including frequency of occurrence of the candidate attributes, relative amounts of negative and positive feedback associated with the candidate attributes, and time density of feedback associated with the candidate attributes; and
   presenting, by the system, for display a visualization of at least one sentiment characteristic of the selected subset of attributes that relate to user sentiment.

2. The method of claim 1, wherein the selecting of the subset of attributes is further according to a selection criterion that places greater importance on negative feedback associated with the candidate attributes.

3. The method of claim 1, wherein the selecting of the subset of attributes is further according to an application-specific selection criterion.

4. The method of claim 1, wherein the selecting is further based on user selection or deselection made in the visualization.

5. The method of claim 1, wherein presenting for display the visualization comprises presenting for display the visualization that includes cells representing the at least one sentiment characteristic of at least one of the attributes in the subset.

6. The method of claim 5, further comprising:
assigning different colors to the cells to indicate respective negative feedback, positive feedback, and neutral feedback associated with the at least one attribute and degree of positive and negative.

7. The method of claim 5, further comprising:
arranging the cells in an arrangement where different columns correspond to different first time intervals, and different rows correspond to different second time intervals, each second time interval having a different length than each first time interval.

8. The method of claim 1, wherein presenting for display the visualization comprises presenting for display a bar chart having plural bars corresponding to different ones of the attributes in the subset, where each of the bars has cells assigned different visual indicators to indicate different types of feedback.

9. The method of claim 8, wherein the visual indicators are assigned based on sentiment scores of respective attributes, the method further comprising:
ordering, in each of the bars, the cells according to the sentiment scores such that each bar includes plural portions, each of the plural portions including a respective group of cells having the same visual indicator.

10. The method of claim 1, wherein presenting for display the visualization comprises presenting for display a graph chart having a first graph corresponding to positive feedback of the attributes in the subset, and a second graph corresponding to negative feedback of the attributes in the subset.

11. The method of claim 1, further comprising using visualization analytics to select the selection criteria from among a larger collection of selection criteria to use.

12. An article comprising at least one non-transitory machine-readable storage medium storing instructions that upon execution cause a system having a processor to:
receive data records containing user feedback regarding at least one offering;
extract candidate attributes from the received data records;
select a subset of attributes from among the candidate attributes, where the attributes in the selected subset relate to user sentiment regarding the at least one offering, wherein the selecting is according to selection criteria including frequency of occurrence of the candidate attributes, relative amounts of negative and positive feedback associated with the candidate attributes, and time density of feedback associated with the candidate attributes; and
present for display a visualization containing a bar chart including plural bars corresponding to the attributes in the selected subset, wherein each of the plural bars depict visual indicators of at least one sentiment characteristic of the corresponding attribute in the selected subset.

13. The article of claim 12, wherein each of the plural bars includes cells associated with individual ones of the data records, and wherein the cells are assigned the respective visual indicators.

14. The article of claim 13, wherein the assigned visual indicators comprise colors.

15. The article of claim 13, wherein the instructions upon execution cause the system to further:
order the cells in each of the plural bars according to the at least one sentiment characteristic, such that at least one of the plural bars has plural portions-cells, each of the portions having cells of the same respective color.

16. The article of claim 12, wherein the at least one sentiment characteristic is a sentiment score indicating user sentiment for each of the attributes of the selected subset.

17. The article of claim 12, wherein the instructions upon execution cause the system to further:
present for display a second visualization having a graph chart, the graph chart having a first graph for positive feedback regarding the attributes in the selected subset, and a second graph for negative feedback regarding the attributes in the selected subset.

18. The article of claim 17, wherein each point along the first graph represents a percentage of positive reviews in the data records for a corresponding one of the attributes in the selected subset, and each point along the second graph represents a percentage of negative reviews in the data records for a corresponding one of the attributes in the selected subset.

19. A system comprising:
a network interface to receive data records containing user feedback regarding at least one offering;
at least one processor to:
from among candidate attributes in the received data records, select a subset of attributes that relate to user sentiment regarding the at least one offering, wherein the selecting is according to selection criteria including frequency of occurrence of the candidate attributes, relative amounts of negative and positive feedback associated with the candidate attributes, and time density of feedback associated with the candidate attributes; and
present for display a visualization of at least one sentiment characteristic of the selected subset of attributes that relate to user sentiment.

20. The system of claim 19, wherein the visualization includes at least one from among:
a bar chart having plural bars containing visual indicators representing the at least one sentiment characteristic for the attributes in the selected subset; and
a graph chart having graphs corresponding to positive and negative reviews for the attributes in the selected subset.

21. The method of claim 1, wherein the selecting according to the relative amounts of negative and positive feedback associated with the candidate attributes comprises selecting based on comparing the amount of negative feedback associated with a given one of the candidate attributes to the amount of positive feedback associated with the given candidate attribute.

22. The method of claim 1, wherein the selecting according to the time density of feedback comprises selecting based on determining an average time gap between feedback for each of the candidate attributes.

23. The article of claim 12, wherein the selecting according to the relative amounts of negative and positive feedback associated with the candidate attributes comprises selecting based on comparing the amount of negative feedback associated with a given one of the candidate attributes to the amount of positive feedback associated with the given candidate attribute.

24. The article of claim 12, wherein the selecting according to the time density of feedback comprises selecting based on determining an average time gap between feedback for each of the candidate attributes.

* * * * *

UNITED STATES PATENT AND TRADEMARK OFFICE
CERTIFICATE OF CORRECTION

PATENT NO. : 8,595,151 B2
APPLICATION NO. : 13/155570
DATED : November 26, 2013
INVENTOR(S) : Ming C. Hao et al.

It is certified that error appears in the above-identified patent and that said Letters Patent is hereby corrected as shown below:

In the Claims

In column 10, line 11, in Claim 15, delete "portions-cells," and insert -- portions, --, therefor.

Signed and Sealed this
Fourth Day of March, 2014

Michelle K. Lee
*Deputy Director of the United States Patent and Trademark Office*